(12) United States Patent
Talib et al.

(10) Patent No.: US 11,698,953 B2
(45) Date of Patent: Jul. 11, 2023

(54) BIOMETRIC FRAUD DETECTION SYSTEM AND METHOD

(71) Applicant: Nuance Communications, Inc., Burlington, MA (US)

(72) Inventors: Haydar Talib, Montreal (CA); Daniele Ernesto Colibro, Alessandria (IT); Claudio Vair, Borgone Susa (IT)

(73) Assignee: Nuance Communications, Inc., Burlington, MA (US)

( * ) Notice: Subject to any disclaimer, the term of this patent is extended or adjusted under 35 U.S.C. 154(b) by 351 days.

(21) Appl. No.: 17/147,573

(22) Filed: Jan. 13, 2021

(65) Prior Publication Data
US 2022/0222328 A1    Jul. 14, 2022

(51) Int. Cl.
*G06F 21/32*  (2013.01)
*G10L 17/04*  (2013.01)
*G06F 21/56*  (2013.01)
*G06F 21/45*  (2013.01)

(52) U.S. Cl.
CPC ............. *G06F 21/32* (2013.01); *G06F 21/45* (2013.01); *G06F 21/566* (2013.01); *G10L 17/04* (2013.01)

(58) Field of Classification Search
CPC ........ G06F 21/32; G06F 21/45; G06F 21/566; G10L 17/04
USPC ........................................................ 713/186
See application file for complete search history.

(56) References Cited

U.S. PATENT DOCUMENTS

| | | | |
|---|---|---|---|
| 9,516,035 B1 * | 12/2016 | Moritz | G06F 21/602 |
| 9,721,175 B2 * | 8/2017 | Kursun | G06V 40/50 |
| 10,027,663 B2 * | 7/2018 | Connell, II | H04L 63/0861 |
| 10,091,180 B1 * | 10/2018 | Moritz | H04L 67/306 |
| 10,303,964 B1 * | 5/2019 | Kursun | G06V 40/50 |
| 11,093,988 B2 * | 8/2021 | Zoldi | G06Q 20/40145 |
| 11,507,645 B1 * | 11/2022 | Hawes | H04L 67/306 |
| 11,521,412 B1 * | 12/2022 | Zhang | G06V 40/10 |
| 2014/0333414 A1 * | 11/2014 | Kursun | G06V 40/50 340/5.82 |
| 2016/0225048 A1 * | 8/2016 | Zoldi | G06Q 30/0609 |
| 2018/0077153 A1 * | 3/2018 | Connell, II | H04L 63/0421 |
| 2020/0128007 A1 * | 4/2020 | Connell, II | H04L 63/0861 |

* cited by examiner

*Primary Examiner* — Samson B Lemma
(74) *Attorney, Agent, or Firm* — Brian J. Colandreo; Heath M. Sargeant; Holland & Knight LLP (57) ABSTRACT

A method, computer program product, and computing system for defining a correction factor for a biometric profile of a plurality of biometric profiles based upon, at least in part, a detection performance metric associated with the biometric profile. The biometric profile may be adjusted based upon, at least in part, the detection policy for the biometric profile.

14 Claims, 4 Drawing Sheets

BIOMETRIC FRAUD DETECTION SYSTEM AND METHOD

TECHNICAL FIELD

This disclosure relates to biometric security systems and methods and, more particularly, to systems and methods for detecting biometric fraud.

BACKGROUND

Voice biometric fraud detection systems primarily compare a caller's voice against a database of known bad actors. Typically, if the voice of the caller matches a known bad actor profile in the database with sufficient confidence, then an agent (or fraud analyst) may be alerted of suspected fraud activity. However, each time a fraud alert is generated, a fraud analyst is required to investigate further. For example, the fraud analyst may have some review process to enact, or the caller will be prevented from fulfilling the purpose of their call (e.g. making a transfer, changing account information). As the number of fraud alerts grows, so do the costs associated with the above activities, whether through loss of efficiency, diminished business, or damaged reputation.

Summary of Disclosure

In one implementation, a computer-implemented method is executed on a computing device and includes defining a detection policy for a biometric profile of a plurality of biometric profiles based upon, at least in part, a detection performance metric associated with the biometric profile. The biometric profile may be adjusted based upon, at least in part, the detection policy for the biometric profile.

One or more of the following features may be included. Defining the detection policy for the biometric profile may include defining a target detection performance metric for the biometric profile. The target detection performance metric may be a target false accept rate for the biometric profile. Defining the detection policy for the biometric profile may include defining a correction factor for the biometric profile based upon, at least in part, a biometric score for the biometric profile at the target detection performance metric for the biometric profile and a biometric score for the other biometric profiles of the plurality of biometric profiles at the target detection performance metric for the plurality of biometric profiles. Adjusting the biometric profile may include adjusting a biometric score associated with the biometric profile by the correction factor. The plurality of biometric profiles may define a fraud watch list of known fraud biometric profiles.

In another implementation, a computer program product resides on a computer readable medium and has a plurality of instructions stored on it. When executed by a processor, the instructions cause the processor to perform operations including defining a detection policy for a biometric profile of a plurality of biometric profiles based upon, at least in part, a detection performance metric associated with the biometric profile. The biometric profile may be adjusted based upon, at least in part, the detection policy for the biometric profile.

One or more of the following features may be included. Defining the detection policy for the biometric profile may include defining a target detection performance metric for the biometric profile. The target detection performance metric may be a target false accept rate for the biometric profile. Defining the detection policy for the biometric profile may include defining a correction factor for the biometric profile based upon, at least in part, a biometric score for the biometric profile at the target detection performance metric for the biometric profile and a biometric score for the other biometric profiles of the plurality of biometric profiles at the target detection performance metric for the plurality of biometric profiles. Adjusting the biometric profile may include adjusting a biometric score associated with the biometric profile by the correction factor. The plurality of biometric profiles may define a fraud watch list of known fraud biometric profiles.

In another implementation, a computing system includes at least one processor and at least one memory architecture coupled with the at least one processor, wherein the at least one processor is configured to define a detection policy for a biometric profile of a plurality of biometric profiles based upon, at least in part, a detection performance metric associated with the biometric profile, and wherein the at least one processor is further configured to adjust the biometric profile based upon, at least in part, the detection policy for the biometric profile.

One or more of the following features may be included. Defining the detection policy for the biometric profile may include defining a target detection performance metric for the biometric profile. The target detection performance metric may be a target false accept rate for the biometric profile. Defining the detection policy for the biometric profile may include defining a correction factor for the biometric profile based upon, at least in part, a biometric score for the biometric profile at the target detection performance metric for the biometric profile and a biometric score for the other biometric profiles of the plurality of biometric profiles at the target detection performance metric for the plurality of biometric profiles. Adjusting the biometric profile may include adjusting a biometric score associated with the biometric profile by the correction factor. The plurality of biometric profiles may define a fraud watch list of known fraud biometric profiles.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
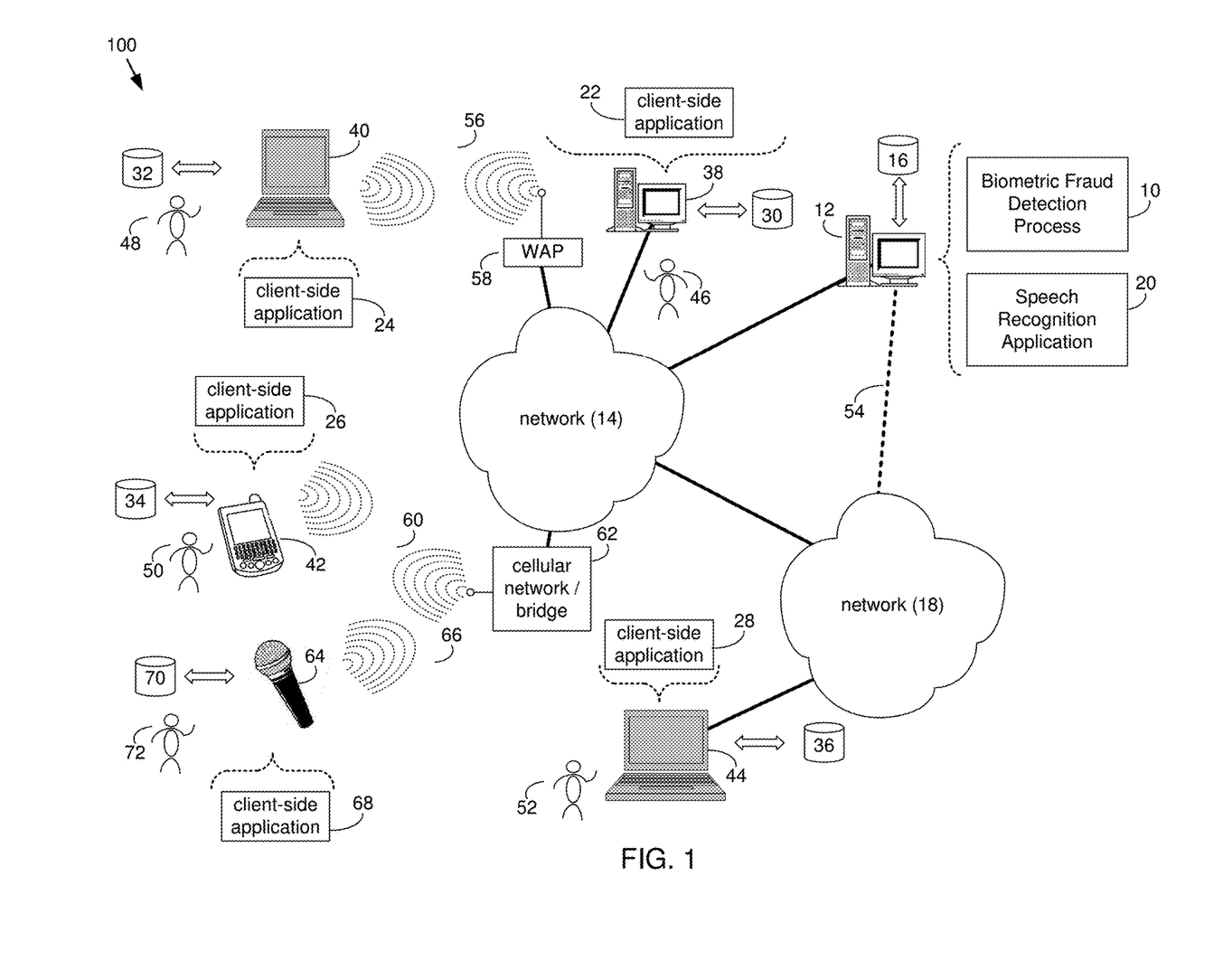
FIG. 1 is a diagrammatic view of a biometric fraud detection process coupled to a distributed computing network.

Referring now to FIG. 1, there is shown biometric fraud detection process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, a biometric fraud detection process, such as biometric fraud detection process 10 of FIG. 1, may define a detection policy for a biometric profile of a plurality of biometric profiles based upon, at least in part, a detection performance metric associated with the biometric profile. The biometric profile may be adjusted based upon, at least in part, the detection policy for the biometric profile.

The instruction sets and subroutines of biometric fraud detection process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Biometric fraud detection process 10 may be a stand-alone application that interfaces with an applet/application that is accessed via client applications 22, 24, 26, 28, 66. In some embodiments, biometric fraud detection process 10 may be, in whole or in part, distributed in a cloud computing topology. In this way, computing device 12 and storage device 16 may refer to multiple devices, which may also be distributed throughout network 14 and/or network 18.

Computing device 12 may execute a speech recognition application (e.g., speech recognition application 20), examples of which may include, but are not limited to, automated speech recognition (ASR) programs and applications, speech-to-text (SST) programs and applications, computer speech recognition programs and applications, voice recognition programs and applications, In-vehicle voice command programs and applications, etc. including those available from Nuance Communications, Inc. of Burlington, Mass. Biometric fraud detection process 10 and/or speech recognition application 20 may be accessed via client applications 22, 24, 26, 28, 68. Biometric fraud detection process 10 may be a stand-alone application, or may be an applet/application/script/extension that may interact with and/or be executed within speech recognition application 20, a component of speech recognition application 20, and/or one or more of client applications 22, 24, 26, 28, 68. Speech recognition application 20 may be a stand-alone application, or may be an applet/application/script/extension that may interact with and/or be executed within biometric fraud detection process 10, a component of biometric fraud detection process 10, and/or one or more of client applications 22, 24, 26, 28, 68. One or more of client applications 22, 24, 26, 28, 68 may be a stand-alone application, or may be an applet/application/script/extension that may interact with and/or be executed within and/or be a component of biometric fraud detection process 10 and/or speech recognition application 20. Examples of client applications 22, 24, 26, 28, 68 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, 68 which may be stored on storage devices 30, 32, 34, 36, coupled to client electronic devices 38, 40, 42, 44 may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 68 may be configured to effectuate some or all of the functionality of biometric fraud detection process 10 (and vice versa). Accordingly, biometric fraud detection process 10 may be a purely server-side application, a purely client-side application, or a hybrid server-side/client-side application that is cooperatively executed by one or more of client applications 22, 24, 26, 28, 68 and/or biometric fraud detection process 10.

One or more of client applications 22, 24, 26, 28, 68 may be configured to effectuate some or all of the functionality of speech recognition application 20 (and vice versa). Accordingly, speech recognition application 20 may be a purely server-side application, a purely client-side application, or a hybrid server-side/client-side application that is cooperatively executed by one or more of client applications 22, 24, 26, 28, 68 and/or speech recognition application 20. As one or more of client applications 22, 24, 26, 28, 68 biometric fraud detection process 10, and speech recognition application 20, taken singly or in any combination, may effectuate some or all of the same functionality, any description of effectuating such functionality via one or more of client applications 22, 24, 26, 28, 68 biometric fraud detection process 10, speech recognition application 20, or combination thereof, and any described interaction(s) between one or more of client applications 22, 24, 26, 28, 68 biometric fraud detection process 10, speech recognition application 20, or combination thereof to effectuate such functionality, should be taken as an example only and not to limit the scope of the disclosure.

Users 46, 48, 50, 52 may access computing device 12 and biometric fraud detection process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Biometric fraud detection process 10 may include one or more user interfaces, such as browsers and textual or graphical user interfaces, through which users 46, 48, 50, 52 may access biometric fraud detection process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14. In some implementations, audio recording device 64 may be wirelessly coupled to network 14 via wireless communication channel 66 established between client electronic device 42 and cellular network/bridge 62, which is shown directly coupled to network 14. Storage device 70 may be coupled to audio recording system 64 and may include but is not limited to: hard disk drives; flash drives, tape drives; optical drives; RAID arrays; random access memories (RAM); and read-only memories (ROM). User 72 may access computing device 12 and biometric fraud detection process 10 (e.g., using one or more of audio recording system 64) directly or indirectly through network 14 or through secondary network 18.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

As discussed above and referring also at least to FIGS. 2-4, biometric fraud detection process 10 may define 200 a detection policy for a biometric profile of a plurality of biometric profiles based upon, at least in part, a detection performance metric associated with the biometric profile. The biometric profile may be adjusted 202 based upon, at least in part, the detection policy for the biometric profile.

In some implementations consistent with the present disclosure, systems and methods may be provided for detecting biometric fraud. As discussed above and in some implementations, voice biometric fraud detection systems primarily compare a caller's voice against a database of known bad actors. Typically, if the voice of the caller matches a known bad actor profile in the database with sufficient confidence, then an agent (or fraud analyst) may be alerted of suspected fraud activity. However, each time a fraud alert is generated, a fraud analyst may be required to investigate further. The fraud analyst may have some recovery process to complete, or the caller will be prevented from fulfilling the purpose of their call (e.g. making a transfer, changing account information). As the number of fraud alerts grows, so do the costs associated with the above activities, whether through loss of efficiency, diminished business, or damaged reputation.

In some implementations, conventional confidence checks are generally based on a decision point that is tuned with a projected operating point (e.g., an expected rate of true positives balanced against false positives). This balancing act, when tuned optimally, may lead to desired performance in terms of maximizing true fraud alerts against bad actor callers, and minimizing false fraud alerts against legitimate callers. The typical implementation of this decision policy is by applying a threshold value to the biometric score for the highest matching fraud profile of a list of fraud profiles.

However, the number of fraud alerts generated by a conventional system may be adversely affected due to outlier fraud profiles within the database of bad actor profiles. These outliers generally do not behave according to the average distribution of other fraud profiles within the database of fraud profiles; these outliers may yield a greater number of false positives, or conversely, more false misses, than the other fraud profiles of the database. As such, the assumption that a global view of the database of bad actors from a statistical performance standpoint is proven false. That is, individual fraud profiles may behave very differently from others of the same database, and so any attempt to apply one global rule or policy in the decision-making will lead to poor outcomes. In other words, when one global score threshold setting applied to the group of all fraud profiles of the database, outliers will have a significant impact on performance by either yielding a disproportionate amount of false positives (which detracts from genuine fraud cases) or false misses (not detecting fraud at the current setting, which can lead to severe financial and reputational damage). As will be discussed in greater detail below, implementations of the present disclosure may allow for biometric fraud detection systems to account for outliers by applying decision policies to fraud profiles of a database of bad actor profiles on an individual basis rather than on a group basis. Additionally, implementations of the present disclosure may improve the accuracy of biometrics-based fraud detection.

Figure 3:
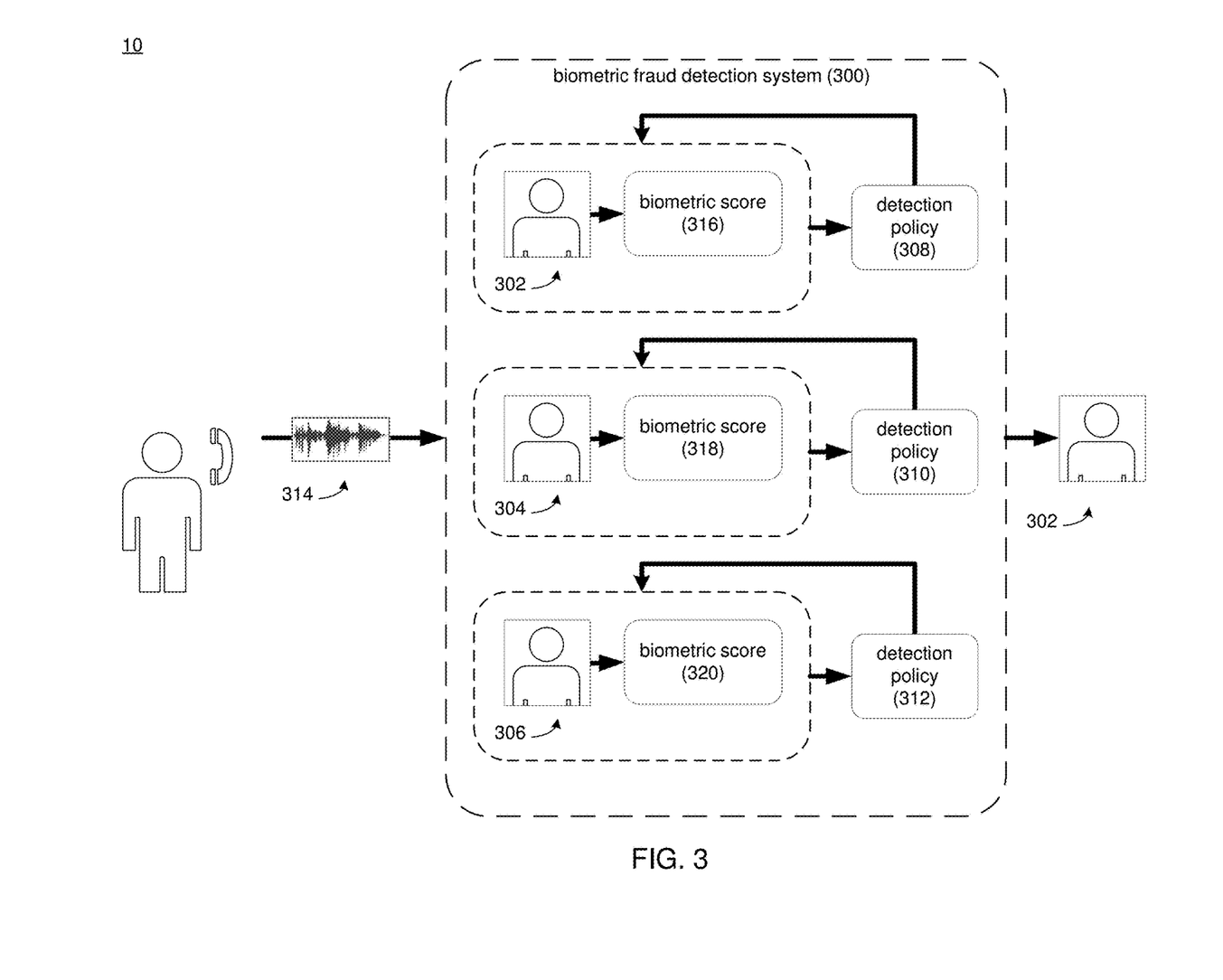
FIG. 3 is a diagrammatic view of a biometric fraud detection system according to one implementation of the biometric fraud detection process of FIG. 1.

Referring also to the example of FIG. 3 and in some implementations, biometric fraud detection process 10 may improve the accuracy of a biometrics-based fraud detection system (e.g., biometric fraud detection system 300), such as Nuance Gatekeeper available from Nuance Communications, Inc. of Burlington, Mass. In some implementations, a biometric fraud detection system may be configured to enable organizations to mitigate fraud losses, improve operational efficiency, and increase customer satisfaction across both voice and digital channels.

In some implementations, the biometric fraud detection system (e.g., biometric fraud detection system 300) may include a plurality of biometric profiles (e.g., biometric profiles 302, 304, 306). While the example of FIG. 3 includes e.g., three biometric profiles, it will be appreciated that any number of biometric profiles may be used within the scope of the present disclosure. As is known in the art, biometrics are a way to measure a person's physical characteristics to verify the person's identity (e.g., physiological traits, such as fingerprints and eyes, or behavioral characteristics, such as a way a person completes a security-authentication puzzle). A biometric profile (e.g., biometric profiles 302, 304, 306) may generally include a portion of biometric data that is configured to identify an individual. For example, a biometric profile (e.g., biometric profiles 302, 304, 306) may include voice biometric data, fingerprint biometric data, etc. that is configured to identify a particular individual. In some implementations, the plurality of biometric profiles (e.g., biometric profiles 302, 304, 306) may include a plurality of voice biometric profiles configured to identify a plurality of individuals based upon their voice biometrics. In some implementations, voice biometric profiles may include one or more recordings of an individual's voice. While an example with voice biometric profiles has been described, it will be appreciated that any biometric data may be used to identify an individual and may be associated with an individual's biometric profile, within the scope of the present disclosure.

In some implementations, the plurality of biometric profiles may define a fraud watch list of known fraud biometric profiles. For example, suppose the plurality of biometric profiles (e.g., biometric profiles 302, 304, 306) are associated with a plurality of individuals who are known to be "fraudsters" or individuals who have engaged in fraudulent activities. As such, biometric fraud detection process 10 may be configured to define a fraud watch list of known fraud biometric profiles (e.g., a fraud watch list of biometric profiles 302, 304, 306). As will be discussed in greater detail below, characteristics of an individual's voice biometric profile (or any other type of biometric profile) may be disproportionately matched or disproportionately not matched when compared to a biometric input. Accordingly, conventional biometric fraud detection systems may apply a global score threshold setting to the fraud watch list and outlying fraud biometric profiles may have a significant impact on performance by either yielding a disproportionate amount of false positives (which detracts from genuine fraud cases) or false misses (not detecting fraud at the current setting, which can lead to severe financial and reputational damage).

Figure 2:
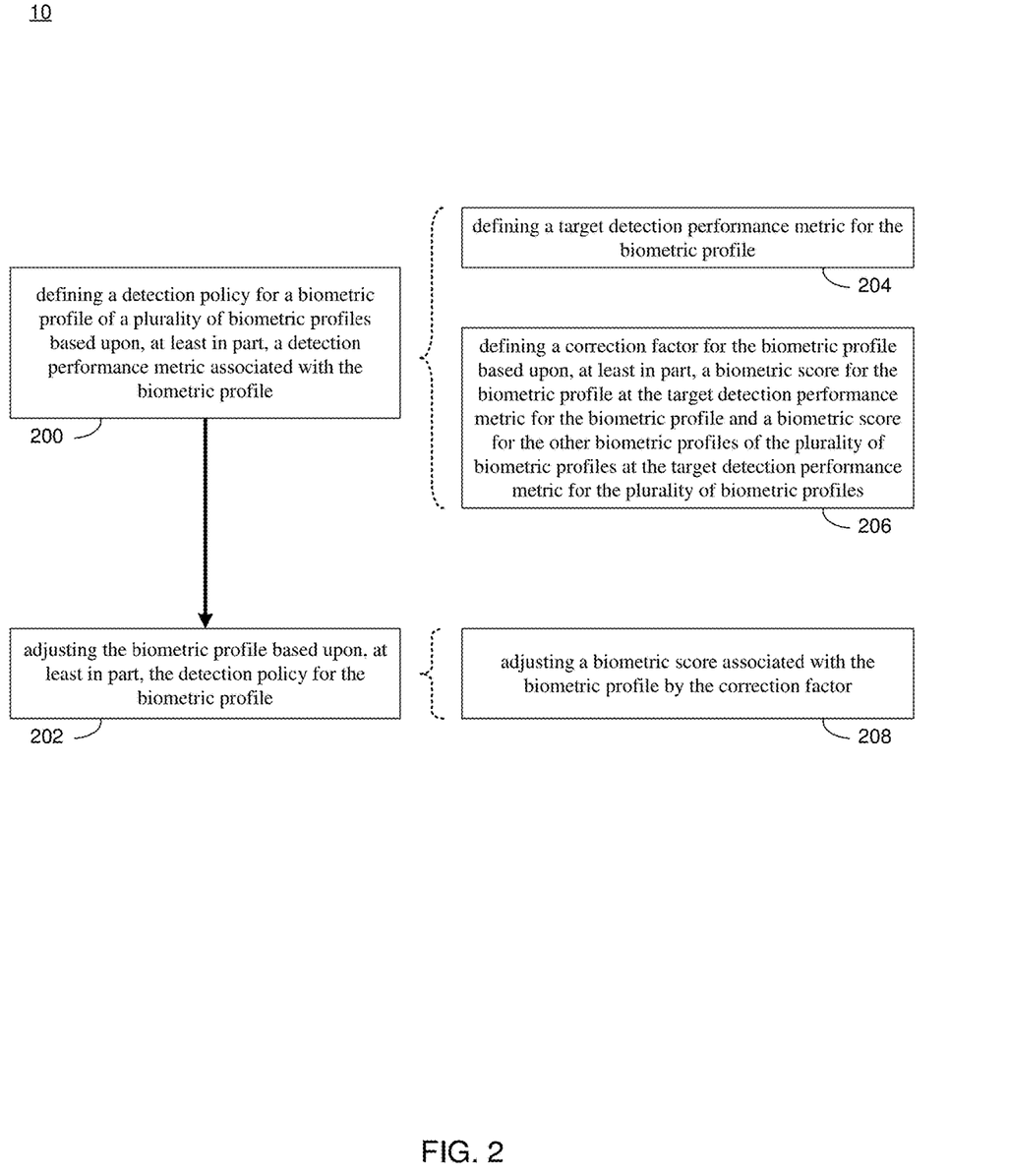
FIG. 2 is a flow chart of one implementation of the biometric fraud detection process of FIG. 1.

In some implementations, biometric fraud detection process 10 may define 200 a detection policy for a biometric profile of a plurality of biometric profiles based upon, at least in part, a detection performance metric associated with the biometric profile. In some implementations and as will be discussed in greater detail below, biometric fraud detection process 10 may define 200 a detection policy specific to each biometric profile. In this manner, biometric fraud detection process 10 may automatically adapt and apply detection policies specific to each biometric profile. Accordingly, biometric fraud detection process 10 may improve the function of biometric fraud detection systems to be robust against any biometric profile outlier behavior. In some implementations, a detection policy may determine what condition(s) must be satisfied for a fraud alert to be generated. For example, conventional detection policies generally include a threshold comparison score (e.g., 95% match between an input biometric and a bad actor biometric profile) which is compared to a plurality of known biometric profiles (e.g., a fraud watch list). However and as discussed above, this general comparison may lead to outliers that generate false fraud alerts or may fail to generate a fraud alert. Accordingly, biometric fraud detection process 10 may define 200 a detection policy for each biometric profile.

For example, biometric fraud detection process 10 may define 200 the detection policy for a biometric profile such that whether or not to generate a fraud alert for a specific comparison between an input biometric and a particular biometric profile is based upon, at least in part, a detection performance metric associated with the biometric profile. In some implementations, a detection performance metric may generally include a quantitative measurement of the performance of the biometric profile in detecting biometric fraud. For example, the detection performance metric may indicate how the decision policy for the biometric profile performs during fraud detection (i.e., a true positive rate, a true negative rate, a false positive rate, a false negative rate, etc.).

In some implementations, defining 200 the detection policy for the biometric profile may include defining 204 a target detection performance metric for the biometric profile. Biometric fraud detection process 10 may utilize a risk-based decision (RBD) to set a target detection performance metric rather than a threshold value when detecting bad actors. As is known in the art, a risk-based decision may generally include an outcome-driven decision policy that makes decisions about whether or not to take an action (e.g., whether or not to generate a fraud alert) based upon particular criteria.

In some implementations, the target detection performance metric may be a target false accept rate for the biometric profile. For example, biometric fraud detection process 10 may define 204 a target detection performance metric for the biometric profile as a target false accept rate (TFAR) of e.g., 1%. In this example, the target false accept rate may define the maximum false accept rate for a particular biometric profile and/or for a plurality of biometric profiles. As will be discussed in greater detail below, while this example target detection performance metric is provided as a percentage, the target detection performance metric may map to adjustments in biometric profiles and/or score values. While an example of a target false accept rate of e.g., 1% has been provided for a target detection performance metric, it will be appreciated that any target detection performance metric may be defined 204 for a biometric profile within the scope of the present disclosure.

Referring again to the example of FIG. 3 and in some implementations, biometric fraud detection process 10 may define 204 a target performance metric for each biometric profile. In this example, biometric fraud detection process 10 may define 204 a target detection performance metric for each biometric profile (e.g., biometric profiles 302, 304, 306) as a target false accept rate (TFAR) of e.g., 1%. In some implementations and in response to defining 204 the target detection performance metric for biometric profiles 302, 304, 306, biometric fraud detection process 10 may define 200 detection policies 308, 310, 312 for biometric profiles 302, 304, 306, respectively based upon, at least in part, the target detection performance metric defined 204 for each biometric profile (e.g., TFAR of 1%). As will be discussed in greater detail below, the decision policy of each biometric profile may determine whether or not to generate a fraud alert when comparing the biometric profile to a biometric input in order to achieve or maintain the target detection performance metric.

In some implementations, biometric fraud detection process 10 may utilize a set of biometric profiles or reference population of biometric profiles to assess the behavior of a particular biometric profile. For example, the reference population may include all or at least a portion of the plurality of biometric profiles discussed above. In some implementations, the reference population may estimate a biometric score probability density function (PDF) when matching a particular biometric profile against other biometric profiles. For example, biometric fraud detection process 10 may estimate a decision policy to be used with each biometric profile for the target detection performance metric (e.g., TFAR of 1%) by assessing the cumulative density function (CDF) of the biometric score PDF (e.g., where the CDF may be obtained from the PDF by numerical integration). In this manner, biometric fraud detection process 10 may utilize a reference population of biometric profiles to estimate or define the decision policy used to determine whether or not to generate a false alert when comparing the biometric profile to a biometric input in order to achieve or maintain the target detection performance metric.

In some implementations, defining 200 the detection policy for the biometric profile may include defining 206 a correction factor for the biometric profile based upon, at least in part, a biometric score for the biometric profile at the target detection performance metric for the biometric profile and a biometric score for the other biometric profiles of the plurality of biometric profiles at the target detection performance metric for the plurality of biometric profiles. For example and referring again to FIG. 3, suppose biometric fraud detection process 10 defines a target detection performance metric of e.g., a TFAR of 1%. Further suppose that biometric fraud detection process 10 determines that biometric profile 302 achieves a biometric score of 98% (e.g., a 98% match probability) at a TFAR of 1%. In other words, biometric profile 302 scores a biometric score of 98% at a TFAR of 1%.

Continuing with the above example, suppose that biometric fraud detection process 10 determines that the other biometric profiles (e.g., biometric profiles 310, 312) achieve a biometric score of 95% (e.g., a 95% match probability) at a TFAR of 1%. In other words, biometric profiles 310, 312 achieve a biometric score of 95% at a TFAR of 1%. While an example of a biometric score has been provided as a percentage ranging from 0%-100%, it will be appreciated that the biometric score may include ratio or probability scoring metric. For example and in some implementations, biometric fraud detection process 10 may determine biometric scores as log-likelihood ratio scores, false-alarm calibrated scores, or any other type of score.

In the above example, biometric fraud detection process 10 may model how different a particular biometric profile (e.g., biometric profile 302) is from the average biometric profile (e.g., biometric profiles 310, 312). In some implementations, biometric fraud detection process 10 may define 206 a correction factor for the biometric profile as the difference of the biometric score (e.g., biometric score of 98%) for the biometric profile (e.g., biometric profile 302) at the target detection performance metric (e.g., TFAR of 1%) and a biometric score (e.g., biometric score of 95%) for the other biometric profiles (e.g., biometric profiles 310, 312) of the plurality of biometric profiles at the target detection performance metric (e.g., TFAR of 1%). For example, biometric fraud detection process 10 may define 206 a correction factor or bias of the biometric profile (e.g., biometric profile 302) relative to the other biometric profiles (e.g., biometric profiles 310, 312) based upon, at least in part, the biometric score of the biometric profile (e.g., biometric profile 302) at the target detection performance metric and the biometric score for the other biometric profiles (e.g., biometric profiles 310, 312) at the target detection performance metric. In this example, biometric fraud detection process 10 may define 206 the correction factor or bias associated with biometric profile 302 as the difference between the biometric score for biometric profile 302 and the biometric score for biometric profiles 310, 312 at the target detection performance metric. Accordingly, biometric fraud detection process 10 may define 206 the correction factor for biometric profile 302 as e.g., three percent (e.g., 98%–95%=3%). While the above example indicates that the correction factor is a positive percentage value, it will be appreciated that the correction factor may be any value, including a negative value, within the scope of the present disclosure.

In some implementations, biometric fraud detection process 10 may adjust 202 the biometric profile based upon, at least in part, the detection policy for the biometric profile. For example and as discussed above, in response to defining 200 the target detection performance metric for a biometric profile, biometric fraud detection process 10 may adjust 202 the biometric profile to achieve or maintain the target detection performance metric. In some implementations, biometric fraud detection process 10 may iteratively adjust 202 the biometric profile until the target detection performance metric for the biometric profile is achieved and/or may continuously adjust 202 the biometric profile to maintain the target detection performance metric defined for that biometric profile. In some implementations, biometric fraud detection process 10 may adjust the biometric profile by recalculating a mapping between the target detection performance metric and biometric scores.

In some implementations, adjusting 202 the biometric profile may include adjusting 208 a biometric score associated with the biometric profile by the correction factor. For example, biometric fraud detection process 10 may adjust 200 a biometric profile by adjusting the biometric score associated with the biometric profile when comparing the biometric profile to a biometric input. As discussed above and in some implementations, the correction factor may define a bias of the biometric profile when compared to an input biometric relative to the other biometric profiles of the plurality of biometric profiles when compared to an input biometric. In this manner, by adjusting 208 the biometric score associated with the biometric profile, biometric fraud detection process 10 may correct the outlier performance characteristics of the biometric profile.

Referring again to the above example where the correction factor is determined to be e.g., three percent (e.g., biometric profile 302 achieves a 98% match probability at a TFAR of 1% minus the 95% match probability the other biometric profiles achieve at the same TFAR). In this example, biometric fraud detection process 10 may adjust the biometric score associated with biometric profile 302 by reducing the biometric score associated with biometric profile 302 by e.g., three percent as biometric profile 302 is generating 98% match probabilities while other biometric profiled are generating 95% match probabilities. In this manner, biometric fraud detection process 10 may lower the biometric score associated with biometric profile by e.g., three percent to compensate for this bias. Accordingly, biometric fraud detection process 10 may define a new biometric score for the biometric profile by adjusting 208 the original biometric score by the correction factor.

Referring again to the example of FIG. 3 and in some implementations, suppose biometric fraud detection process 10 receives a biometric input (e.g., biometric input 314). In this example, suppose biometric fraud detection process 10 receives biometric input from a person making a call (e.g., a voice biometric input). In some implementations, biometric fraud detection process 10 may provide the biometric input to a biometric fraud detection system (e.g., biometric fraud detection system 300). In this example, biometric fraud detection process 10 may, via biometric fraud detection system 300, compare biometric input 314 to a plurality of biometric profiles (e.g., biometric profiles 302, 304, 306). Biometric fraud detection system 300 may generate a plurality of biometric scores (e.g., biometric scores 316, 318, 320) indicative of the match probability between each biometric profile and the biometric input.

As discussed above and in some implementations, suppose biometric score 316 indicates a 99% chance of matching biometric input 314. In this example, biometric fraud detection process 10 may adjust 208 biometric score 316 associated with the biometric profile 302 by the correction factor (e.g., reduce the biometric score by three percent). Accordingly, biometric fraud detection process 10 may compare the corrected biometric score (e.g., 99%−3%=96%) to detection policy 308 for biometric profile 302. In this example, suppose that a 95% match probability is required to achieve the target detection performance metric of e.g., a TFAR of 1%. Accordingly, biometric fraud detection process 10 may detect a sufficient match between biometric profile 302 and biometric input 314. In this manner, biometric fraud detection process 10 may generate a fraud alert for biometric input 314 based upon the e.g., 96% match probability between biometric profile 302 and biometric input 314.

In another example, suppose biometric score 316 indicates a 95% chance of matching biometric input 314. In this example, biometric fraud detection process 10 may adjust 208 biometric score 314 associated with the biometric profile 302 by the correction factor (e.g., reduce the biometric score by three percent). Accordingly, biometric fraud detection process 10 may compare the corrected biometric score (e.g., 95%−3%=92%) to detection policy 308 for biometric profile 302. In this example, suppose that a 95% match probability is required to achieve the target detection performance metric of e.g., a TFAR of 1%. Accordingly, biometric fraud detection process 10 may not detect a sufficient match between biometric profile 302 and biometric input 314. In this manner, biometric fraud detection process 10 may not generate a fraud alert for biometric input 314 based upon the e.g., 92% match between biometric profile 302 and biometric input 314.

In some implementations, embodiments of the present disclosure may automatically adapt to individual differences in biometric profiles, as well as to any future changes to individual biometric profiles. In some implementations, biometric fraud detection process 10 may flexibly adjust individual biometric profiles while retaining an assurance that performance will remain fixed to a particular target detection performance metric (e.g., a TFAR of 1%). Accordingly, if a biometric profile is consistently underperforming compared to other biometric profiles on a watch list, the biometric profile can be modified, enhanced or adapted to improve its individual performance without adversely impacting the group performance for the watch list.

In some implementations, biometric fraud detection process 10 may provide stable individual statistical performance while allowing for more optimal global settings by predictably modeling the performance of the watch list (in terms of a target detection performance metric) regardless of poorly performing outlier biometric profiles. In some implementations, biometric fraud detection process 10 may optimize the performance of individual biometric profiles while providing flexibility to modify biometric profiles without adversely impacting overall watch list performance.

Figure 4:
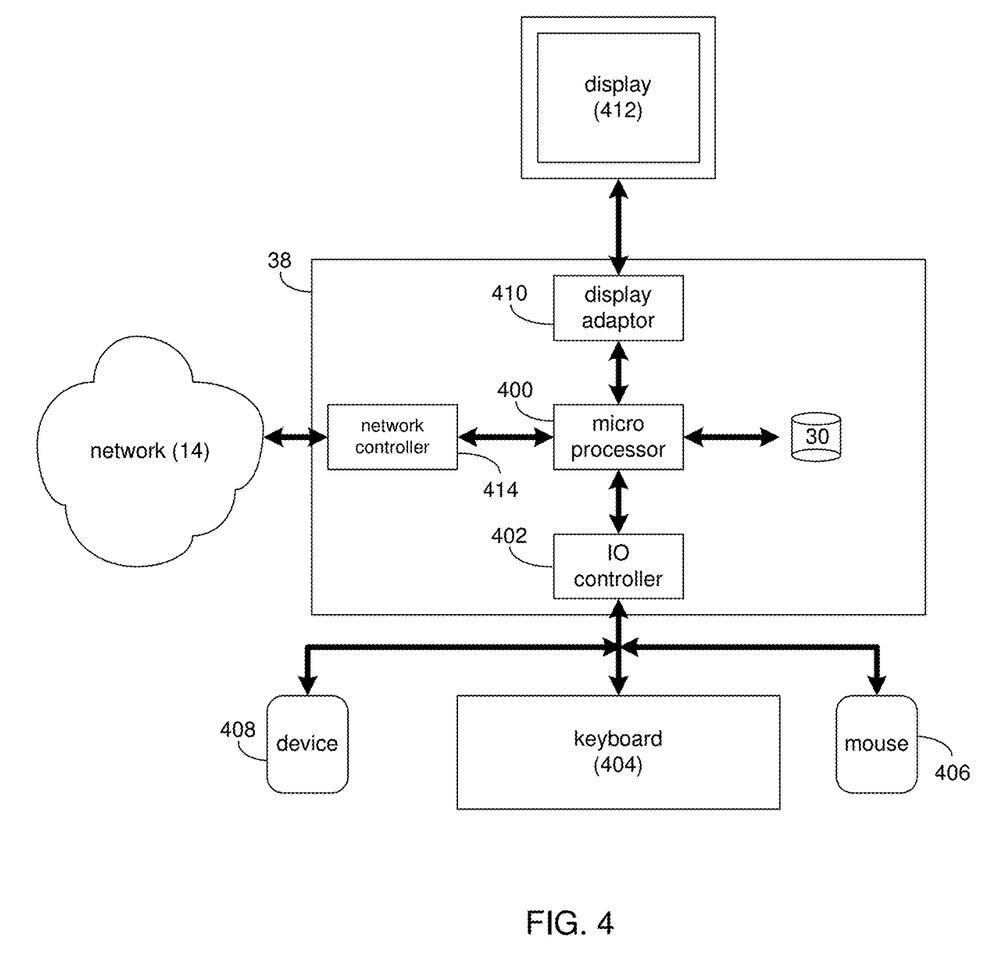
FIG. 4 is an example diagrammatic view of a client electronic device of FIG. 1 according to one or more example implementations of the disclosure.

Referring also to FIG. 4, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, biometric fraud detection process 10 may be substituted for client electronic device 38 within FIG. 4, examples of which may include but are not limited to computing device 12 and/or client electronic devices 40, 42, 44.

Client electronic device 38 may include a processor and/or microprocessor (e.g., microprocessor 400) configured to, e.g., process data and execute the above-noted code/instruction sets and subroutines. Microprocessor 400 may be coupled via a storage adaptor (not shown) to the above-noted storage device(s) (e.g., storage device 30). An I/O controller (e.g., I/O controller 402) may be configured to couple microprocessor 400 with various devices, such as keyboard 404, pointing/selecting device (e.g., mouse 406), custom device, such a microphone (e.g., device 408), USB ports (not shown), and printer ports (not shown). A display adaptor (e.g., display adaptor 410) may be configured to couple display 412 (e.g., CRT or LCD monitor(s)) with microprocessor 400, while network controller/adaptor 414 (e.g., an Ethernet adaptor) may be configured to couple microprocessor 400 to the above-noted network 14 (e.g., the Internet or a local area network).

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising: defining a detection policy for a biometric profile of a plurality of biometric profiles based upon, at least in part, a detection performance metric associated with the biometric profile; adjusting the biometric profile based upon, at least in part, the detection policy for the biometric profile; wherein defining the detection policy for the biometric profile includes defining a target detection performance metric for the biometric profile; and wherein defining the detection policy for the biometric profile includes defining a correction factor for the biometric profile based upon, at least in part, a biometric score for the biometric profile at the target detection performance metric for the biometric profile and a biometric score for the other biometric profiles of the plurality of biometric profiles at the target detection performance metric for the plurality of biometric profiles.

2. The computer-implemented method of claim 1, wherein the target detection performance metric is a target false accept rate for the biometric profile.

3. The computer-implemented method of claim 1, wherein adjusting the biometric profile includes adjusting a biometric score associated with the biometric profile by the correction factor.

4. The computer-implemented method of claim 1, wherein the plurality of biometric profiles define a fraud watch list of known fraud biometric profiles.

5. The computer-implemented method of claim 1, wherein the plurality of biometric profiles include a plurality of voice biometric profiles.

6. A computer program product residing on a non-transitory computer readable medium having a plurality of instructions stored thereon which, when executed by a processor, cause the processor to perform operations comprising: defining a detection policy for a biometric profile of a plurality of biometric profiles based upon, at least in part, a detection performance metric associated with the biometric profile; adjusting the biometric profile based upon, at least in part, the detection policy for the biometric profile; wherein defining the detection policy for the biometric profile includes defining a target detection performance metric for the biometric profile; and wherein defining the detection policy for the biometric profile includes defining a correction factor for the biometric profile based upon, at least in part, a biometric score for the biometric profile at the target detection performance metric for the biometric profile and a biometric score for the other biometric profiles of the plurality of biometric profiles at the target detection performance metric for the plurality of biometric profiles.

7. The computer program product of claim 6, wherein the target detection performance metric is a target false accept rate for the biometric profile.

8. The computer program product of claim 6, wherein adjusting the biometric profile includes adjusting a biometric score associated with the biometric profile by the correction factor.

9. The computer program product of claim 6, wherein the plurality of biometric profiles define a fraud watch list of known fraud biometric profiles.

10. The computer program product of claim 6, wherein the plurality of biometric profiles include a plurality of voice biometric profiles.

11. A computing system comprising: a memory; and a processor configured to define a detection policy for a biometric profile of a plurality of biometric profiles based upon, at least in part, a detection performance metric associated with the biometric profile, wherein the processor is further configured to adjust the biometric profile based upon, at least in part, the detection policy for the biometric profile; wherein defining the detection policy for the biometric profile includes defining a target detection performance metric for the biometric profile; and wherein defining the detection policy for the biometric profile includes defining a correction factor for the biometric profile based upon, at least in part, a biometric score for the biometric profile at the target detection performance metric for the biometric profile and a biometric score for the other biometric profiles of the plurality of biometric profiles at the target detection performance metric for the plurality of biometric profiles.

12. The computing system of claim 11, wherein the target detection performance metric is a target false accept rate for the biometric profile.

13. The computing system of claim 11, wherein adjusting the biometric profile includes adjusting a biometric score associated with the biometric profile by the correction factor.

14. The computing system of claim 11, wherein the plurality of biometric profiles define a fraud watch list of known fraud biometric profiles.

* * * * *